United States Patent
Kani

(10) Patent No.: US 12,474,067 B2
(45) Date of Patent: Nov. 18, 2025

(54) MOVING HEATING ELEMENT

(71) Applicant: Arash Kani, Easton, CT (US)

(72) Inventor: Arash Kani, Easton, CT (US)

(*) Notice: Subject to any disclaimer, the term of this patent is extended or adjusted under 35 U.S.C. 154(b) by 0 days.

(21) Appl. No.: 18/676,317

(22) Filed: May 28, 2024

(65) Prior Publication Data

US 2024/0310056 A1 Sep. 19, 2024

Related U.S. Application Data

(63) Continuation of application No. 17/122,790, filed on Dec. 15, 2020, now Pat. No. 12,025,320.

(51) Int. Cl.
| | | |
|---|---|---|
| *F24D 13/00* | (2006.01) | |
| *F24C 7/06* | (2006.01) | |
| *F24C 15/32* | (2006.01) | |
| *H05B 3/00* | (2006.01) | |
| *H05B 6/12* | (2006.01) | |

(52) U.S. Cl.
CPC .......... *F24D 13/00* (2013.01); *F24C 7/067* (2013.01); *H05B 3/0014* (2013.01); *H05B 3/0071* (2013.01); *F24C 15/325* (2013.01); *H05B 6/1209* (2013.01)

(58) Field of Classification Search
CPC ...... H05B 3/62; H05B 3/0014; H05B 3/0071; H05B 1/0263; H05B 6/1209; F24C 7/067; F24C 15/325; F24C 15/24; F24D 13/00
See application file for complete search history.

(56) References Cited

U.S. PATENT DOCUMENTS

| | | | | |
|---|---|---|---|---|
| 4,596,914 A | * | 6/1986 | Morino | H05B 6/6482 219/400 |
| 6,091,057 A | * | 7/2000 | Asami | F24C 7/06 219/685 |
| 7,045,751 B2 | * | 5/2006 | Kim | F24C 7/06 219/685 |
| 10,960,983 B2 | * | 3/2021 | Paulson | H05B 3/20 |
| 2007/0170172 A1 | * | 7/2007 | Otsuka | H05B 6/145 399/328 |
| 2012/0211923 A1 | * | 8/2012 | Garner | B23K 26/60 264/400 |
| 2017/0001266 A1 | * | 1/2017 | Li | B23K 26/361 |
| 2017/0021419 A1 | * | 1/2017 | Ng | B22F 12/37 |
| 2017/0041988 A1 | * | 2/2017 | Kiyosawa | C21D 1/42 |
| 2018/0161939 A1 | * | 6/2018 | Maynard | B23K 26/0734 |
| 2019/0006209 A1 | * | 1/2019 | Wieser | F25B 21/02 |
| 2019/0018350 A1 | * | 1/2019 | Usui | H05B 1/0241 |
| 2019/0295866 A1 | * | 9/2019 | Yoshida | G03F 7/70716 |

* cited by examiner

*Primary Examiner* — Brian W Jennison
(74) *Attorney, Agent, or Firm* — Edlavitch Law PLLC

(57) ABSTRACT

A heating element can be moved by a machine, such as a machine including a fan, an actuator, or a conveyor. The heating element can be attached to or embedded in a fan or an actuator. Or, the heating element can be attached to or embedded in a conveyor belt of a conveyor. A combination of a heating element and a mover machine can be further combined with a heat radiating wall. The heating element and the machine can be arranged behind the wall. And, when the heating element and the machine are powered on, the heating element converts electrical energy into heat, which increases the temperature of the wall, and the machine moves the heating element to be next to different areas of the wall. This allows for heat to be distributed more evenly to the wall than it would be if the heating element did not move.

20 Claims, 16 Drawing Sheets

MOVING HEATING ELEMENT

TECHNICAL FIELD

The present disclosure relates to moving heating elements and systems including moving heating elements, such as household appliances having moving heating elements.

CROSS-REFERENCE TO RELATED APPLICATIONS

The present application claims the benefit of priority from U.S. patent application Ser. No. 17/122,790, filed on Dec. 15, 2020, and entitled "MOVING HEATING ELEMENT", the entire disclosure of which application is hereby incorporated herein by reference.

BACKGROUND

A heating element converts electrical energy into heat through Joule heating. Heating of the element occurs from electric current passing through the element and encountering resistance within the element. The process of increasing the temperature of a heating element using electricity is often referred to as induction heating. Induction heating includes heating an electrically conducting object (usually a metal) using electromagnetic induction. The heat generated occurs in the heating element from eddy currents flowing through the element. An induction heater typically includes an electromagnet and an electronic oscillator that passes a high-frequency alternating current (AC) through the electromagnet. The resulting magnetic field penetrates the object or heating element, generating electric currents inside the conductor (i.e., eddy currents). The resistance in the object or heating element to the eddy currents heat the object by Joule heating.

In an induction heating process and the heating of a heating element, heat is generated inside the object itself, instead of by an external heat source via heat conduction. Because the temperature increase in the element is direct and does not rely on the properties of external matter, the object can be heated rapidly. Also, there is no need for an external contact, which can cause contamination and a loss in heating efficiency in the heating element. The use of induction heating is widespread, and popularly used in ovens, cooktops, space heaters, and other household appliances that rely on the efficient generation of heat using electricity.

However, with the benefits of heating elements, there are tradeoffs. For example, materials that makeup heating elements are expensive. Thus, a technical problem to be solved is how to increase the effectiveness of a heating element without increasing its size and the amount of materials used to create the element.

SUMMARY

Described herein are heating elements and systems including such elements that can be moved by a machine, such as a machine including a fan, an actuator, or a conveyor. For example, in some embodiments, a heating element can be attached to or embedded in a fan or an actuator. Also, the heating elements can be attached to or embedded in a conveyor belt of a conveyor. Described herein is also a heat radiating wall that can be a part of an apparatus or a system that includes one of the heating elements described herein. The heat radiating wall includes a heat conductive material such as stainless steel, heat-dried clay, glass, or the like, or a combination thereof.

The heating element and the machine are behind the heat radiating wall, and when the heating element and the machine are powered on, the heating element converts electrical energy into heat which increases the temperature of the heat radiating wall as well as the machine moves the heating element to be next to different areas of the heat radiating wall. This allows for heat to be distributed more evenly to the wall than it would be if the heating element did not move.

In some embodiments, the heating element and the machine for moving the heating element are combined with a second machine for generating air flow. In some embodiments, the machine for moving the heating element and the machine for generating the air flow is the same machine. For example, a fan with one or more heating elements included with the blades of the fan can be used to move the heating elements and provide heat and airflow to the heat radiating wall. In embodiments including an air mover (such as a fan), the heat radiating wall includes openings such as holes, slits, apertures, or gaps. In some embodiments, the wall can include a mesh screen. The aforesaid technologies and the technologies described herein can be used for many different applications. For example, such technologies can improve kitchen and household appliances that rely on a heating element. Such technologies can also be used for other foreseeable applications such as the heating of a seat in a car.

Described herein are apparatuses, systems and methods for increasing the effectiveness of a heating element without increasing its size and the amount of materials used to create the element. The increased effectiveness comes from heating and moving the heating element instead of merely heating the element. In improving a heating element's effectiveness, the technologies described herein overcome at least the aforesaid technical problem mentioned in the background section as well as technical problems mentioned in other parts of the application and other technical problems not described herein but recognized by those skilled in the art.

With respect to some embodiments, disclosed herein are methods that include computerized methods for controlling use and moving of a heating element, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for controlling use and moving of a heating element.

With respect to some embodiments, a system is provided that includes at least one computing device configured to provide ways for controlling use and moving of a heating element. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIG. 2A shows the actuator fully retracted and FIG. 2B shows the actuator fully extended.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
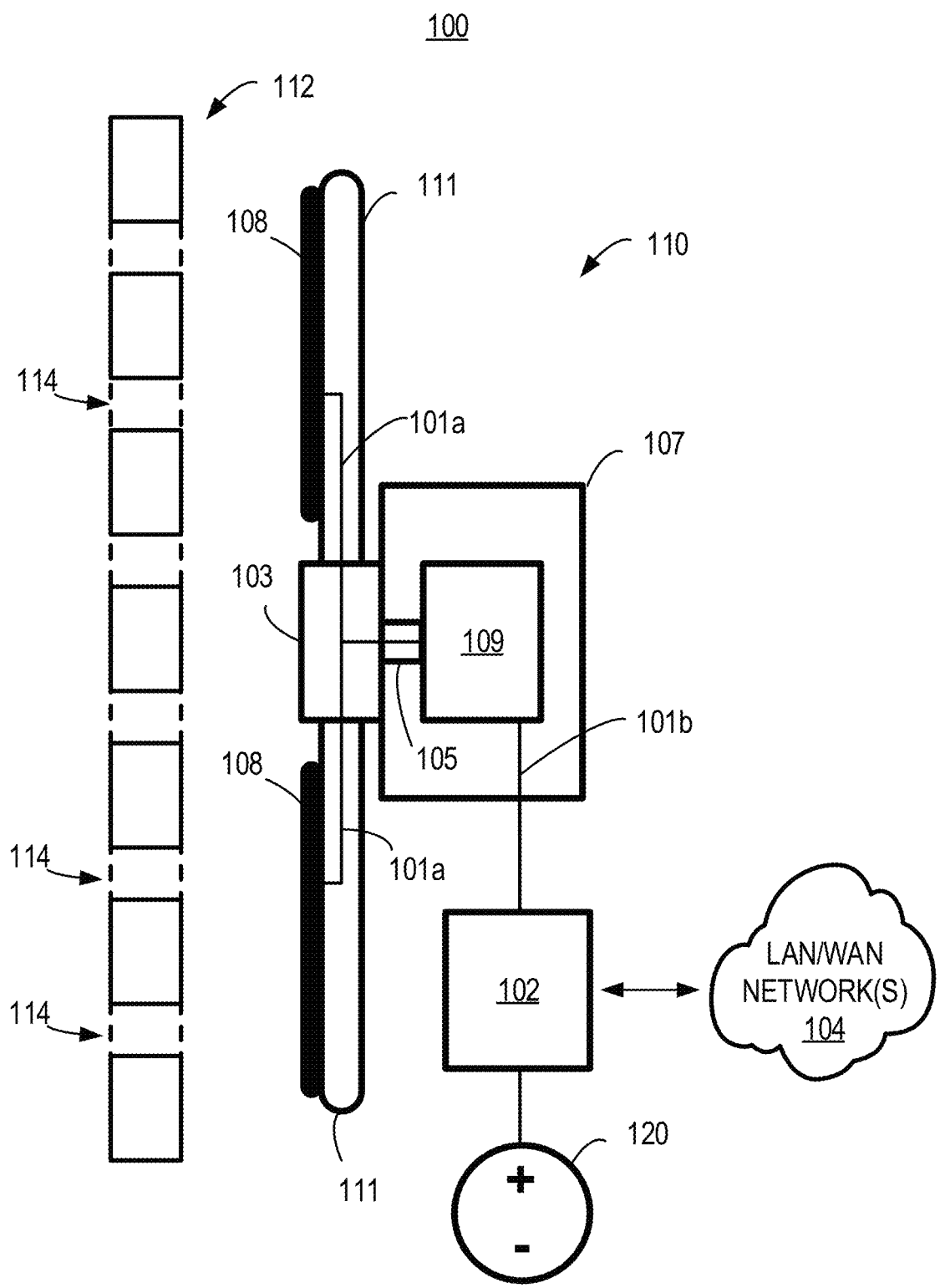
FIG. 1 illustrates a schematic side view of a system including a heat radiating wall with openings, a fan, and heating elements attached to blades of the fan as well as a controller connected to one or more communication networks, which controls the fan and heating elements, with some portions of the wall and fan being broken away to reveal internal details of construction, in accordance with some embodiments of the present disclosure.
Figure 2A:
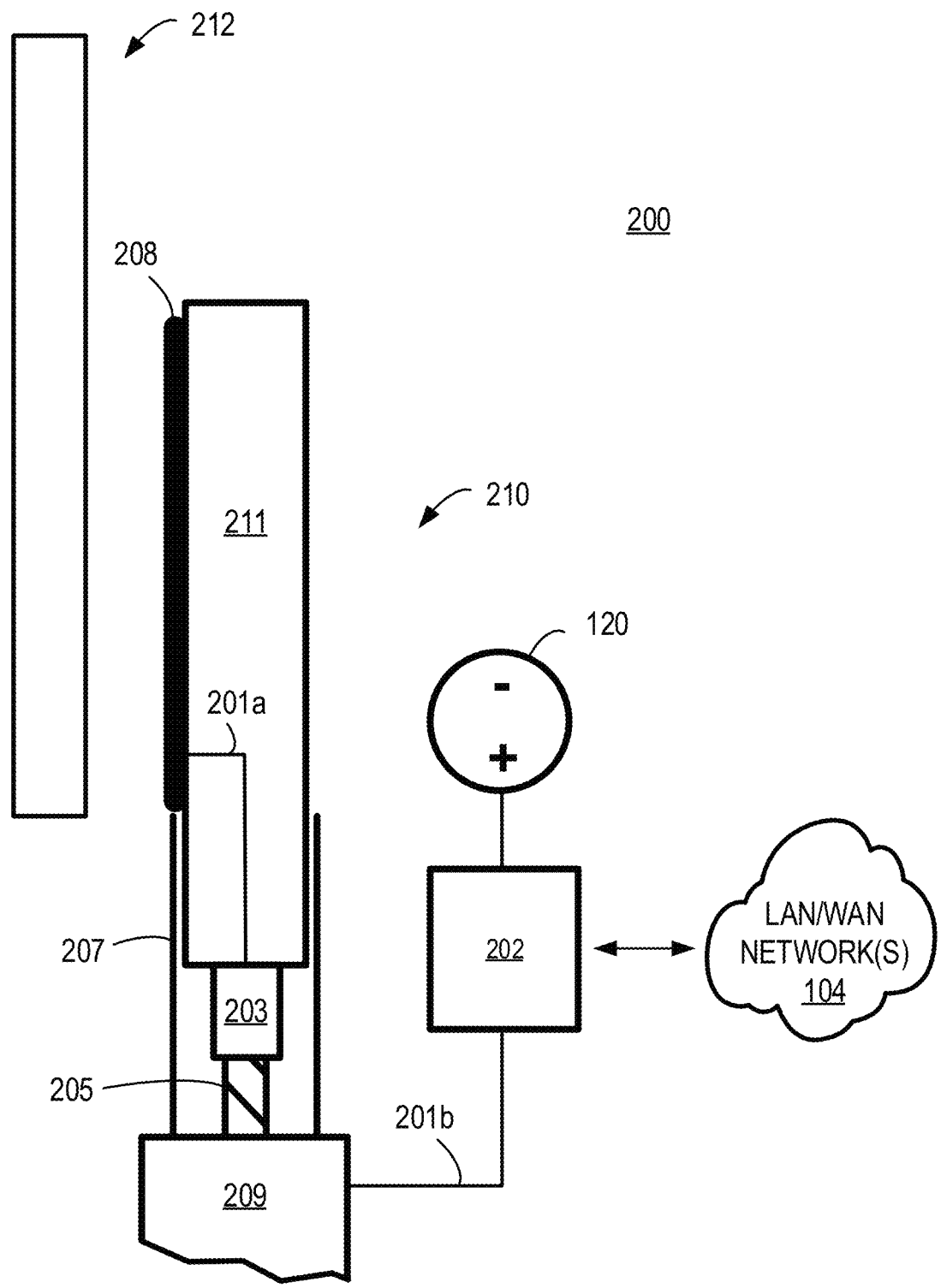
FIGS. 2A and 2B illustrate a schematic side view of a system including a heat radiating wall without openings, a linear actuator, and a heating element attached to the actuator as well as a controller connected to one or more communication networks, which controls the actuator and heating element, with some portions of the actuator being broken away to reveal internal details of construction, in accordance with some embodiments of the present disclosure. As shown.
Figure 2B:
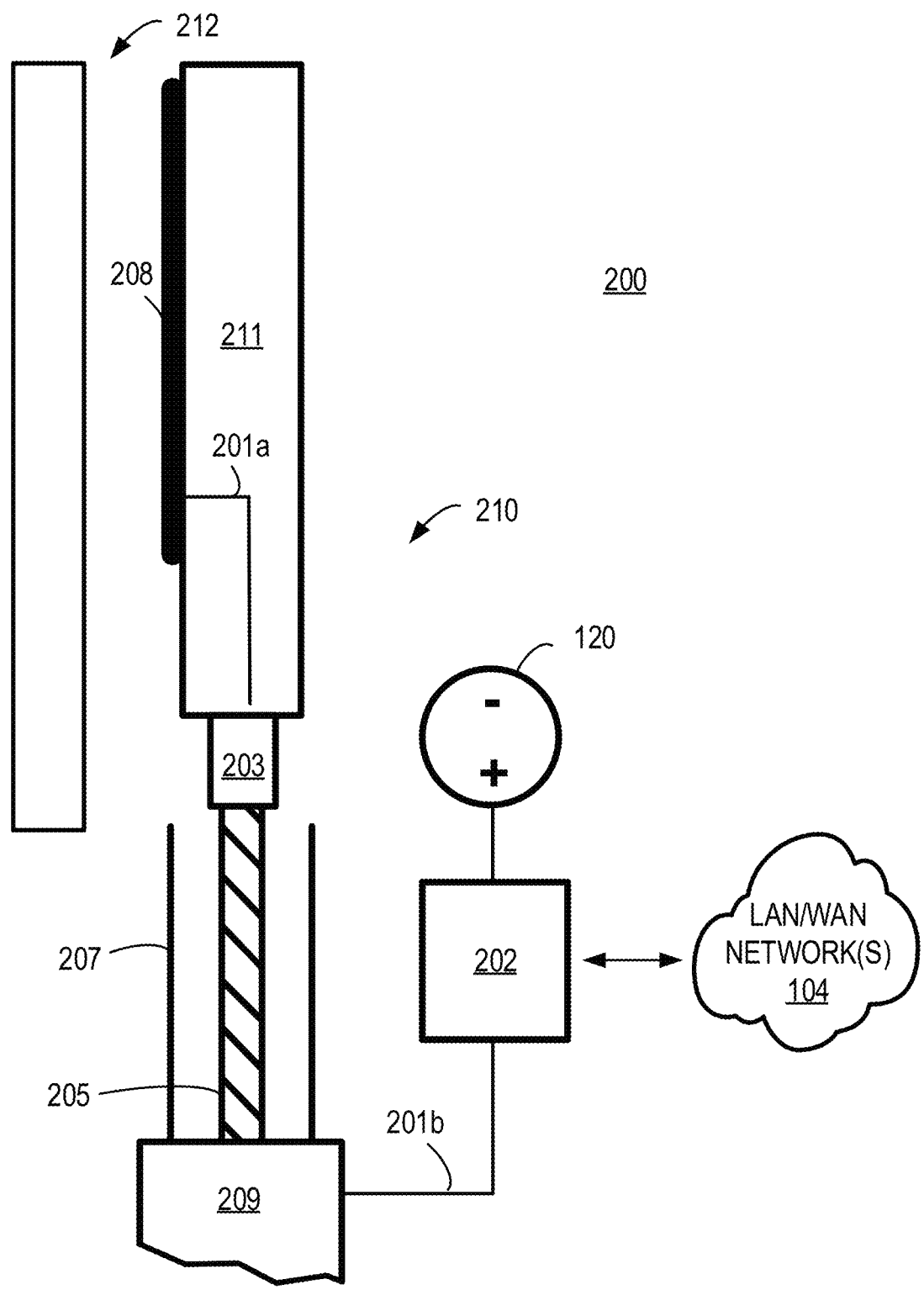
Figure 3:
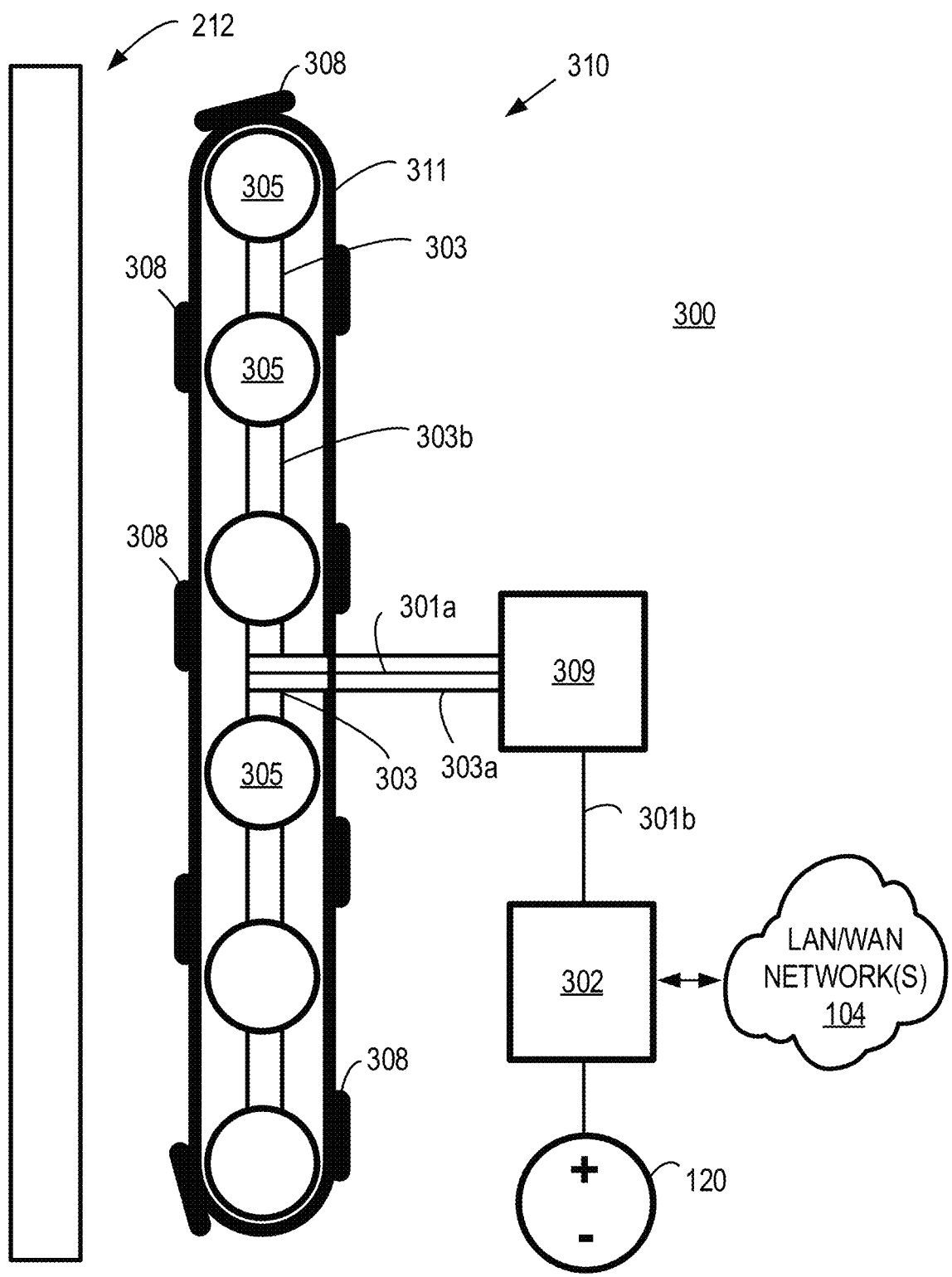
FIG. 3 illustrates a schematic side view of a system including a heat radiating wall without openings, a conveyor having a conveyor belt, and heating elements attached to the conveyor belt as well as a controller connected to one or more communication networks, which controls the conveyor and heating elements, with some portions of the conveyor being broken away to reveal internal details of construction, in accordance with some embodiments of the present disclosure.

Described herein are apparatuses, systems, and methods including or implemented using heating elements that can be moved by a machine, such as a machine including a fan, an actuator, or a conveyor (e.g., see FIGS. 1 to 3). For example, in some embodiments, a heating element can be attached to or embedded in a fan (e.g., see FIG. 1) or an actuator (e.g., see FIGS. 2A and 2B). Also, the heating elements can be attached to or embedded in a conveyor belt (e.g., see FIG. 3). Described herein is also a heat radiating wall (e.g., see walls 112 and 212 shown in FIGS. 1 to 3 respectively) that can be a part of an apparatus or a system that includes one of the heating elements described herein.

The heating element and the machine are behind the heat radiating wall (e.g., see FIGS. 1 to 3), and when the heating element and the machine are powered on, the heating element converts electrical energy into heat which increases the temperature of the heat radiating wall as well as the machine moves the heating element to be next to different areas of the heat radiating wall. This allows for heat to be distributed more evenly to the wall than it would be if the heating element did not move.

In some embodiments, the heating element and the machine for moving the heating element are combined with a second machine for generating air flow (an example is not depicted in the drawings). In some embodiments, the machine for moving the heating element and the machine for generating the air flow is the same machine (e.g., see FIG. 1). For example, a fan with one or more heating elements included with the blades of the fan can be used to move the heating elements and provide heat and airflow to the heat radiating wall (e.g., see FIG. 1). In embodiments including an air mover (such as a fan), the heat radiating wall can be a heat radiating wall with openings, such as a wall including holes, slits, apertures, or gaps (e.g., see wall 112 shown in FIG. 1). Or, in some embodiments, the wall can include a mesh screen (an example is not depicted in the drawings). The aforesaid technologies and the technologies described herein can be used for many different applications. For example, such technologies can improve kitchen and household appliances that rely on a heating element (e.g., see FIG. 12). Such technologies can also be used for other foreseeable applications such as the heating of a seat in a car (an example is not depicted in the drawings).

Described herein are apparatuses, systems and methods for increasing the effectiveness of a heating element without increasing its size and the amount of materials used to create the element. The increased effectiveness comes from heating and moving the heating element instead of merely heating the element. In improving a heating element's effectiveness, the technologies described herein overcome at least the aforesaid technical problem mentioned in the background section as well as technical problems mentioned in other parts of the application and other technical problems not described herein but recognized by those skilled in the art.

FIG. 1 illustrates a schematic side view of a system 100 including a heat radiating wall 112 with openings 114, a fan 110, and heating elements 108 attached to blades 111 of the fan as well as a controller 102 connected to one or more computer networks 104. The controller 102 controls the fan 110 and heating elements 108. Some portions of the wall 112 and fan 110 are broken away to reveal internal details of construction. The system 100 is in accordance with some embodiments of the present disclosure. As shown, the fan 110 includes blades 111, an electric motor 109, a housing 107 for the motor, a rotor 105, a rotor-to-blade interface 103, lines 101a (in which electric current passes through lines 101a to the heating elements 108 from the motor), and lines 101b (in which electric current passes from the controller 102 to the motor 109).

In lines 101b, one of the channels for electric current can carry information as input for control of the motor 109. Also, in lines 101b, one or more of the channels for electric current can carry direct current to the motor 109 to power the motor so that it can rotate the rotor 105. An aspect of the motor 109 can convert the direct current to alternating current and the motor can provide the alternating current to the heating elements 108 via lines 101a. As shown, the blades 111, the rotor-to-blade interface 103, and the rotor 105 house the lines 101a. The rotor-to-blade interface 103 houses and connects to parts of the blades 111 and the rotor 105. The aforesaid connections to the rotor-to-blade interface 103 provide for the blades 111 and the heating elements 108 to rotate in conjunction with the rotor 105 and the motor 109 when the rotor rotates from rotational force generated by the motor.

The controller 102 controls the motor 109 of the fan 110 or at least controls the electric power and current provided to the motor 109. The controller 102 can operate according to information sent to the controller from computing systems (e.g., see computing system 400) via network(s) 104. A more detailed disclosure of the network(s) 104 is provided in the description of FIG. 5 and a more detailed disclosure of computing system 400 and an optional part of the controller 102 is provided in the description of FIG. 4). In some embodiments, the controller 102 is known circuitry for providing power management for a motor of a fan (such as motor 109) as well as basic control for the motor via the power management. Also, shown is a voltage source 120, which can provide direct current. The controller 102 or the motor 109 can also include a converter (not depicted) to convert direct current to alternating current. The controller 102 can also include a computing system, such as shown inferentially by the controller communicating with the network(s) 104. In some embodiments, the voltage source 120 is a controlled voltage source.

As shown in FIG. 1, the heat radiating wall 112 includes openings 114 in which air moved by the fan 110 can pass through the openings from behind the wall to in front of the wall. The air that passes through the openings 114 can be heated by the heating elements 108 as well as the wall 112 can be heated by the heating elements 108. As the heating elements 108 are heated and rotated by parts of the fan 110, the rotating heating elements can distribute heat to the wall 112 more evenly than if the heating elements were merely located behind the wall and could not move. The rotating heating elements 108 provide a greater area for heat transfer to the wall 112 than if the elements did not move, and the air movement generated by the fan 110 provides convection heating through the wall 112 and its openings 114. The wall 112 can include a heat conductive material such as stainless steel, heat-dried clay, glass, or the like, or a combination thereof. For example, the wall 112 can be a ceramic or ceramic and glass heat radiating wall. Or, the wall 112 can be a stainless-steel wall only or a stainless-steel wall having ceramic and/or glass elements.

FIGS. 2A and 2B illustrate a schematic side view of a system 200 including a heat radiating wall 212 without openings, a linear actuator 210, and a heating element 208 attached to an oscillating part 211 (such as a sliding tube) of the actuator as well as a controller 202 connected to the network(s) 104. The controller 202 controls the actuator 210 and heating element 208. Some portions of the actuator 210 are broken away to reveal internal details of construction of the actuator. The system 200 is in accordance with some embodiments of the present disclosure. Also, FIG. 2A shows the actuator 210 fully retracted and FIG. 2B depicts the actuator fully extended. The actuator 210 includes the oscillating part 211, an electric motor 209, a housing 207 that can maintain alignment of the oscillating part (e.g., a fixed cover for a sliding tube), a lead screw 205, a fixed nut 203, lines 201a (in which electric current passes through lines 201a to the heating element 208 from the motor 209), and lines 201b (in which electric current passes from the controller 202 to the motor 209). In some embodiments, the actuator 210 can be a traveling-nut linear actuator, wherein the lead screw 205 rotates and moves towards and away from the motor 209 while the fixed nut 203 and the oscillating part 211 do not rotate. In such examples, the fixed nut 203 can interlock with the housing 207 to prevent the fixed nut 203 and the oscillating part 211 from rotating with respect to the housing 207. Such a mechanism causes the oscillating part 211 to extend and retract from the motor 209. As the oscillating part 211 extends and retracts from the motor 209, so does the heating element 208 since the element is attached to the oscillating part. The heating element 208 is attached to the oscillating part 211 at a position of the oscillating part facing the wall 212.

In lines 201b, one of the channels for electric current can carry information as input for control of the motor 209. Also, in lines 201b, one or more of the channels for electric current can carry direct current to the motor 209 to power the motor so that it can rotate the lead screw 205. An aspect of the motor 209 can convert the direct current to alternating current and the motor can provide the alternating current to the heating element 208 via lines 201a. The oscillating part 211, the fixed nut 203, and/or the lead screw 205 can house the lines 201a. Or, the lines 201a can be connected to the motor 209 and the heating element 208 directly without such housing of the lines. The fixed nut 203 connects the oscillating part and the lead screw 205. The aforesaid connections to the fixed nut 203 provide for the oscillating part 211 and the heating element 208 to move partially in conjunction with the lead screw 205 and the motor 209 when the screw rotates from rotational force generated by the motor, which causes the oscillating part to extend and retract from the motor along with the heating element since the element is attached to the oscillating part.

The controller 202 controls the motor 209 of the actuator 210 or at least controls the electric power and current provided to the motor 209. The controller 202 can operate according to information sent to the controller from computing systems (e.g., see computing system 400) via the network(s) 104. A more detailed disclosure of the network(s) 104 is provided in the description of FIG. 5 and a more detailed disclosure of computing system 400 and an optional part of the controller 202 is provided in the description of FIG. 4). In some embodiments, the controller 202 is known circuitry for providing power management for a motor of a linear actuator (such as motor 209) as well as basic control for the motor via the power management. Also, shown is the voltage source 120. The controller 202 or the motor 209 can also include a converter (not depicted) to convert direct current from the voltage source 120 to alternating current. The controller 202 can also include a computing system, such as shown inferentially by the controller communicating with the network(s) 104.

As shown in FIG. 2, the heat radiating wall 212 includes a surface facing the actuator 210 and a surface facing away from the actuator. Heat can pass through the wall 212 from the one surface to the other surface. The wall 212 can be heated by the heating element 208, which causes the heat transfer from the one surface to the other surface of the wall. As the heating element 208 is heated and moved by parts of the actuator 210, the heating element can distribute heat to the wall 212 more evenly than if the heating element were merely located behind the wall and could not move. The moving heating element 208 provides a greater area for heat transfer to the wall 212 than if the element did not move. The wall 212 can include a heat conductive material such as stainless steel, heat-dried clay, glass, or the like, or a combination thereof. For example, the wall 212 can be a ceramic or ceramic and glass heat radiating wall. Or, wall 212 can be a stainless-steel wall only or a stainless-steel wall having ceramic and/or glass elements.

FIG. 3 illustrates a schematic side view of a system 300 including the heat radiating wall 212, a conveyor 310, and heating elements 308 attached to a conveyor belt 311 of the conveyor as well as a controller 302 connected to the network(s) 104. The controller 302 controls the conveyor 310 and heating elements 308. Some portions of the conveyor 310 are broken away to reveal internal details of construction of the conveyor. The system 300 is in accordance with some embodiments of the present disclosure. The conveyor 310 includes an electric motor 309, drive shafts 303a and 303b rotated by the motor when the motor is powered, rotors 305 rotated by connections to the drive shaft 303b when the drive shaft 303b is rotated, and the conveyor belt 311 that is moved by the rotors. The conveyor 310 also includes lines 301a (in which electric current passes through lines 301a to the heating elements 308 from the electric motor 309 via conductive elements in the drive shafts 303a and 303b and rotors 305), and lines 301b (in which electric current passes from the controller 302 to the electric motor 309). As the conveyor belt 311 moves from the rotors 305 turning, so does the heating elements 308 since the elements are attached to the belt. The heating elements 308 are attached to the conveyor belt 311 at positions along the entirety of the belt so that at least some of the heating elements 308 are facing the wall 212 when the belt is moving behind the wall.

In lines 301b, one of the channels for electric current can carry information as input for control of the electric motor 309. Also, in lines 301b, one or more of the channels for electric current can carry direct current to the electric motor 309 to power the motor so that it can rotate the drive shafts 303a and 303b. An aspect of the electric motor 309 can convert the direct current to alternating current and the motor can provide the alternating current to the heating elements 308 via lines 301a and conductive aspects of the drive shaft 303b and the rotors 305. The drive shaft 303a can house the lines 301a.

The electric motor 309 connected to the drive shaft 303a which is connected to the drive shaft 303b which is connected to the rotors 305 which abut the belt or connect to the belt provides for the motor to indirectly through the mechanical circuit to move the belt along with the heating elements 308 attached to the belt when powered on.

The controller 302 controls the electric motor 309 of the conveyor 310 or at least controls the electric power and current provided to the electric motor 309. The controller 302 can operate according to information sent to the controller from computing systems (e.g., see computing system 400) via the network(s) 104. A more detailed disclosure of the network(s) 104 is provided in the description of FIG. 5 and a more detailed disclosure of computing system 400 and an optional part of the controller 302 is provided in the description of FIG. 4). In some embodiments, the controller 302 is known circuitry for providing power management for a motor of a conveyor (such as motor 309) as well as basic control for the motor via the power management. Also, shown is the voltage source 120. The controller 302 or the electric motor 309 can also include a converter (not depicted) to convert direct current from the voltage source 120 to alternating current. The controller 302 can also include a computing system, such as shown inferentially by the controller communicating with the network(s) 104.

FIG. 3 also shows the heat radiating wall 212 that includes a surface facing the conveyor 310 and a surface facing away from the conveyor. Heat can pass through the wall 212 from the one surface to the other surface. The wall 212 can be heated by the heating elements 308, which causes the heat transfer from the one surface to the other surface of the wall. As the heating elements 308 are heated and moved by parts of the conveyor 310, the heating element can distribute heat to the wall 212 more evenly than if the heating element were merely located behind the wall and could not move. The moving heating elements 308 provide a greater area for heat transfer to the wall 212 than if the elements did not move.

Figure 4:
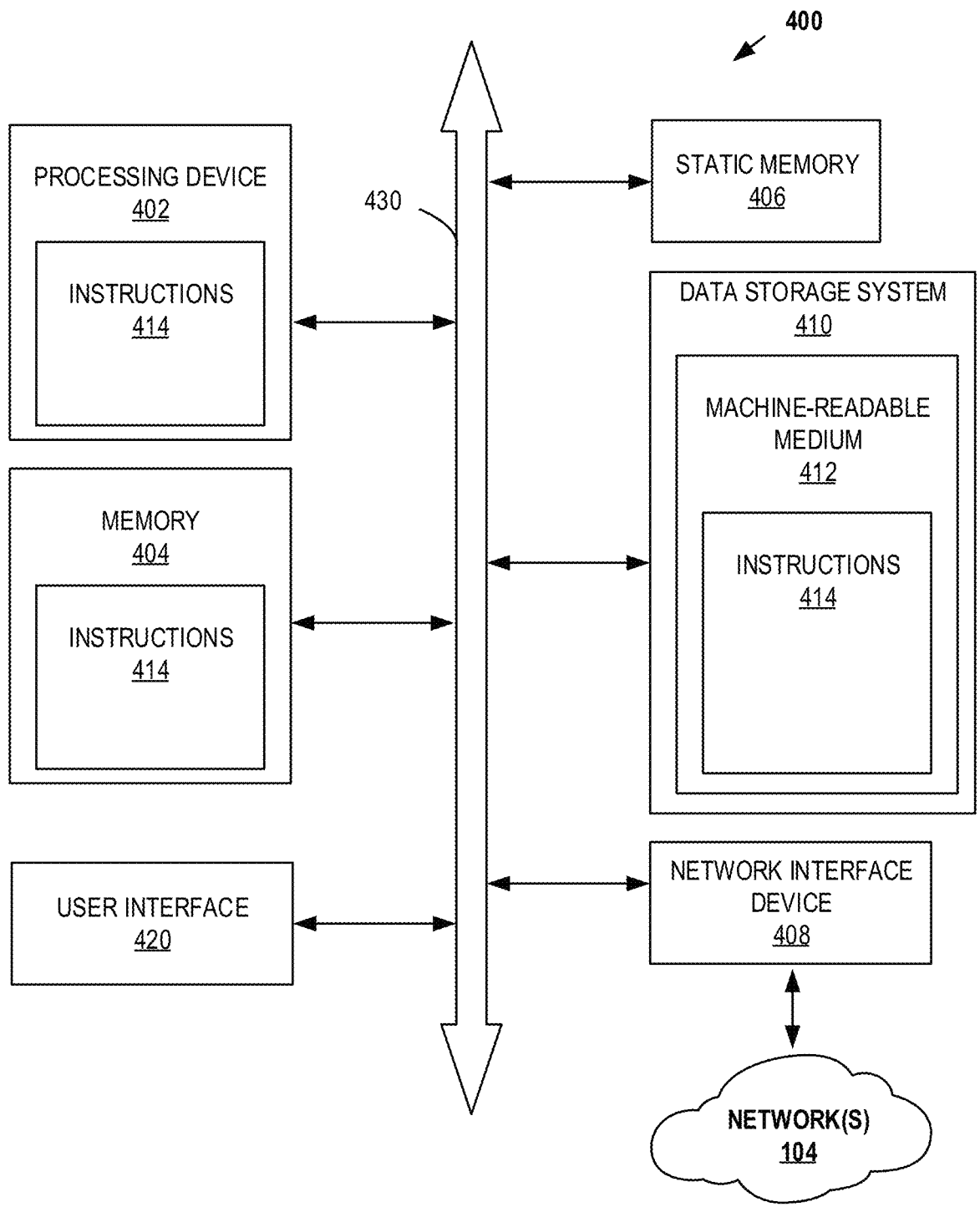
FIG. 4 illustrates is a block diagram of example aspects of a computing system, in accordance with some embodiments of the present disclosure.

FIG. 4 illustrates is a block diagram of example aspects of computing system 400 (which can be a part of controller 102, 202, or 302), in accordance with some embodiments of the present disclosure. FIG. 4 illustrates parts of the computing system 400 within which a set of instructions, for causing the machine to perform any one or more of the computerized methodologies discussed herein, can be executed. In some embodiments, the computing system 400 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 400 includes a processing device 402, a main memory 404 (e.g., read-only memory (ROM), flash memory, dynamic random-access memory (DRAM), etc.), a static memory 406 (e.g., flash memory, static random-access memory (SRAM), etc.), and a data storage system 410, which communicate with each other via a bus 430.

The processing device 402 represents one or more general-purpose processing devices such as a microprocessor, a central processing unit, or the like. More particularly, the processing device can be a microprocessor or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 414 for performing the operations discussed herein. The computing system 400 can further include a network interface device 408 to communicate over the network(s) 104 shown in FIGS. 1 to 12.

The data storage system 410 can include a machine-readable storage medium 412 (also known as a computer-readable medium) on which is stored one or more sets of instructions 414 or software embodying any one or more of the computerized methodologies or functions described herein. The instructions 414 can also reside, completely or at least partially, within the main memory 404 and/or within the processing device 402 during execution thereof by the processing device 402, the main memory 404 and the processing device 402 also constituting machine-readable storage media.

In some embodiments, the instructions 414 include instructions to implement functionality corresponding to any one of the computing devices, data processors, user interface devices, I/O devices, and sensors described herein. While the machine-readable storage medium 412 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 400 includes user interface 420 that can include a display and implement functionality corresponding to any one of the user interface devices disclosed herein. A user interface, such as user interface 420, or a user interface device described herein can include any space or equipment where interactions between humans and machines occur. A user interface described herein can allow operation and control of the machine from a human user, while the machine can simultaneously provide feedback information to the user. Examples of a user interface, UI, or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information on test weights to a user of the system. Sound can also be added to a GUI, such that the UI is a multimedia user interface (MUI) can provide test weight information to the user via visual and audio means. UI described herein can also include virtual reality or augmented reality aspects.

Figure 5:
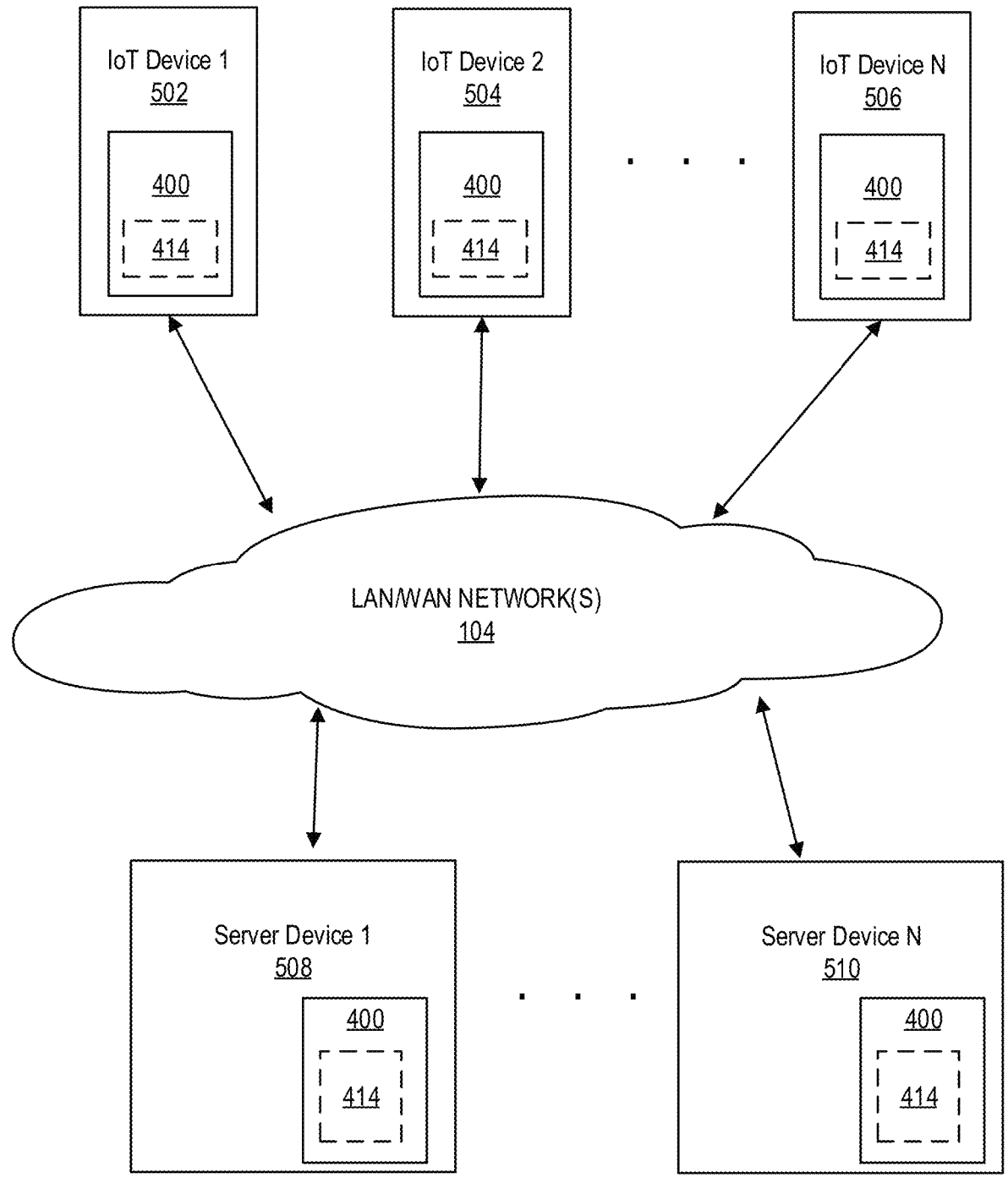
FIG. 5 illustrates an example network including Internet of Things (IoT) devices and servers that each include a computing system (such as shown in greater detail in FIG. 4) and communicate through a communication network, in accordance with some embodiments of the present disclosure.

FIG. 5 illustrates a network 500 including IoT devices (e.g., see IoT devices 502, 504, and 506) and servers (e.g., see servers 508 and 510) that each include an instance of the computing system 400 (shown in greater detail in FIG. 4) and that can communicate through network(s) 104, in accordance with some embodiments of the present disclosure.

The IoT devices (which can include smart appliances such as the smart appliances shown in FIGS. 6 to 12) are shown communicating with the servers through the network(s) 104. Shown in FIG. 5, the servers and the IoT devices each include an instance of the computing system 400 and instances of the instructions 414. Each of the instances of the computing system 400 and the instructions 414 may vary per IoT device or server. The combine IoT devices and servers of the network 500 can each include an instance of the computing system 400. As mentioned, the computing system 400 includes a processor, memory, a communication interface and optionally one or more sensors. In the illustrated examples, the network(s) 104 include the Internet; however, it is to be understood that in some embodiments, network(s) connecting the client devices to servers may not include the Internet; and thus, the IoT devices shown in FIG. 5 would be considered client devices and not IoT devices.

The network(s) 104 can include one or more local area networks (LAN(s)) and/or one or more wide area networks (WAN(s)). The network(s) 104 include the Internet and any other type of interconnected communications network. For example, the network(s) 104 can include a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown computing component of the network 500 (including computing system 400 and network(s) 104) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 6:
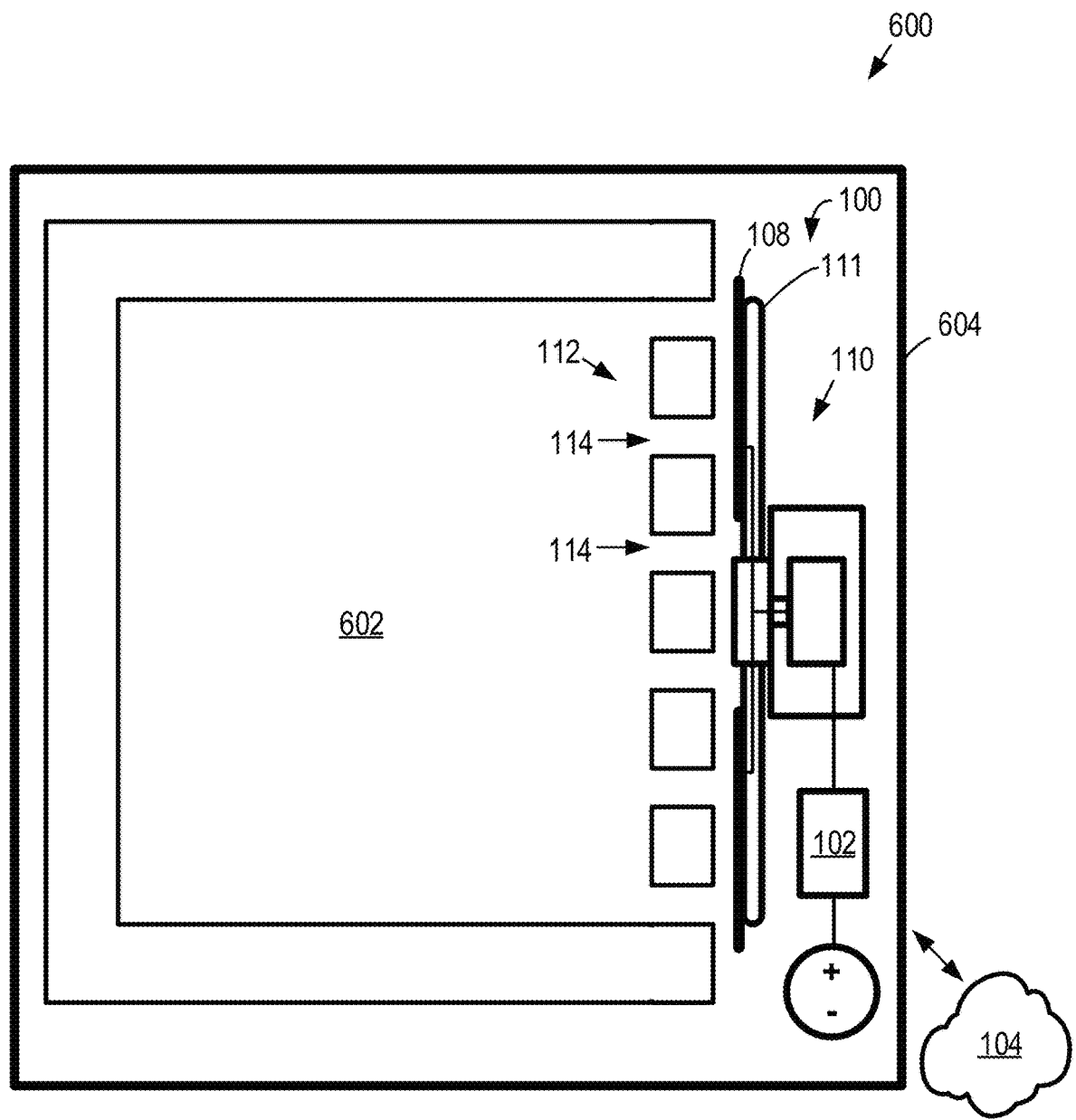
FIG. 6 illustrates a schematic side view of a convection oven including the system shown in FIG. 1, with some portions of the convection oven being broken away to reveal internal details of construction, in accordance with some embodiments of the present disclosure.

FIG. 6 illustrates a schematic side view of a convection oven 600 including the system 100 shown in FIG. 1, with some portions of the convection oven being broken away to reveal internal details of construction, in accordance with some embodiments of the present disclosure. As shown, the fan 110 of system 100 faces a cavity 602 of convection oven 600 and the wall 112. Also, the fan 110 and system 100 are position near a back wall 604 of the convection oven 600. This way the fan 110 can blow heated air through the openings 114 of the wall 112 and the heating elements 108 on the blades 111 of the fan can heat the wall 112 and the airflow at the back of the cavity 602. This can cause the cavity 602 to heat up more consistently than if the convection did not exist and the heating elements did not move. Also, the controller 102 is shown within the convection oven 600 communicating with the network(s) 104 making the oven an IoT device and a smart appliance.

Figure 7:
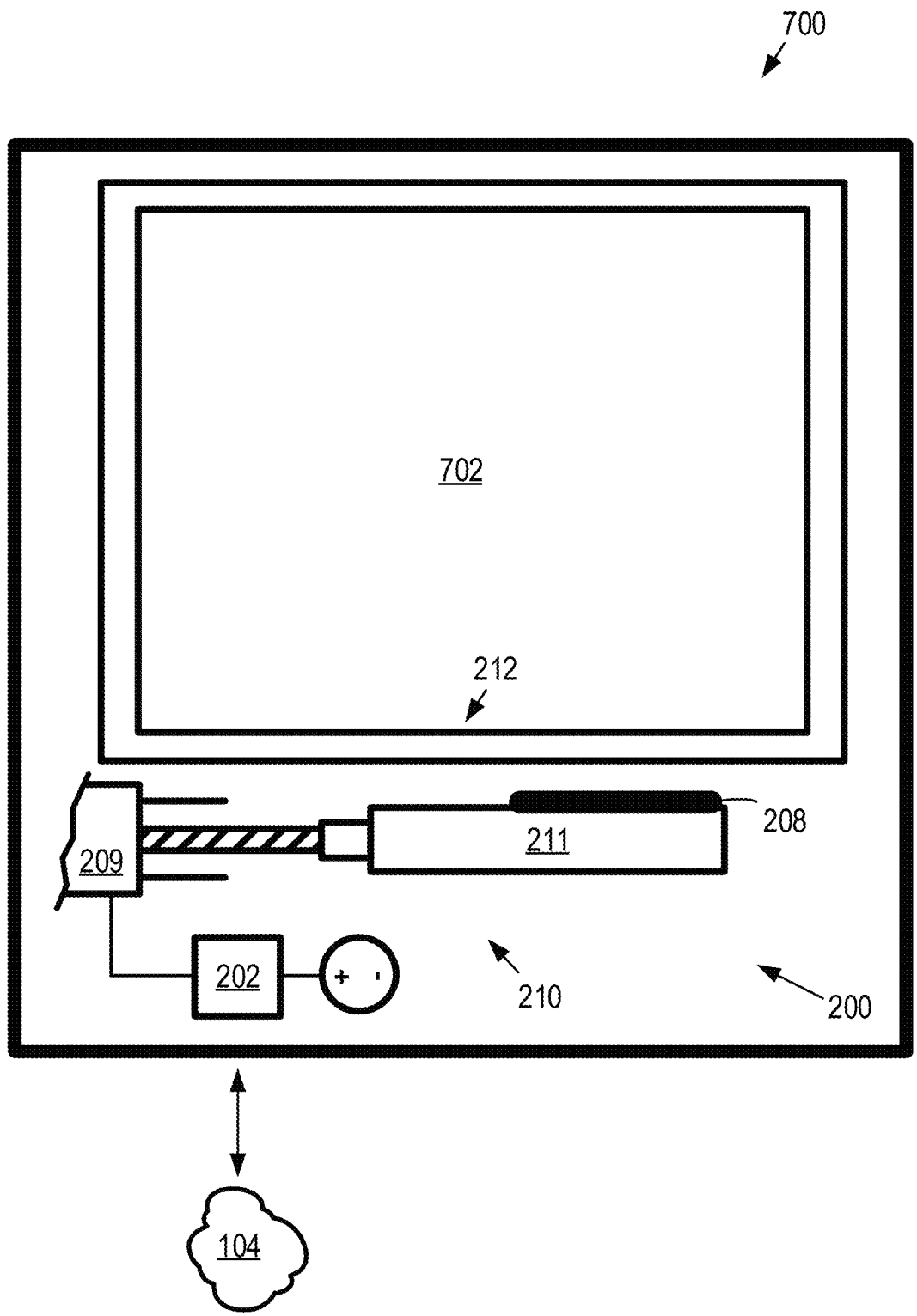
FIG. 7 illustrates a schematic side view of an oven including the system shown in FIGS. 2A and 2B, with some portions of the oven being broken away to reveal internal details of construction, in accordance with some embodiments of the present disclosure.

FIG. 7 illustrates a schematic side view of a regular or non-convection oven 700 including the system 200 shown in FIGS. 2A and 2B, with some portions of the oven being broken away to reveal internal details of construction, in accordance with some embodiments of the present disclosure. As shown, the actuator 210 of system 200 is below a cavity 702 of the oven 700 and the wall 212, and the surface of the oscillating part 211 attached to the heating element 208 is facing the cavity 702. Also, the actuator 210 and system 200 are position near a bottom inner wall of the oven 700 (which can be considered wall 212). This way the actuator 210 can heat the wall 212 at the bottom of the cavity 702 and the heat from the wall 212 can move upwards through the cavity until the air in the cavity is almost equally heated through the cavity. The movement of the heating element can also cause the cavity 702 to heat up more consistently than if the heating element did not move. Also, the controller 202 is shown within the oven 700 communicating with the network(s) 104 making the oven an IoT device and a smart appliance.

Figure 8:
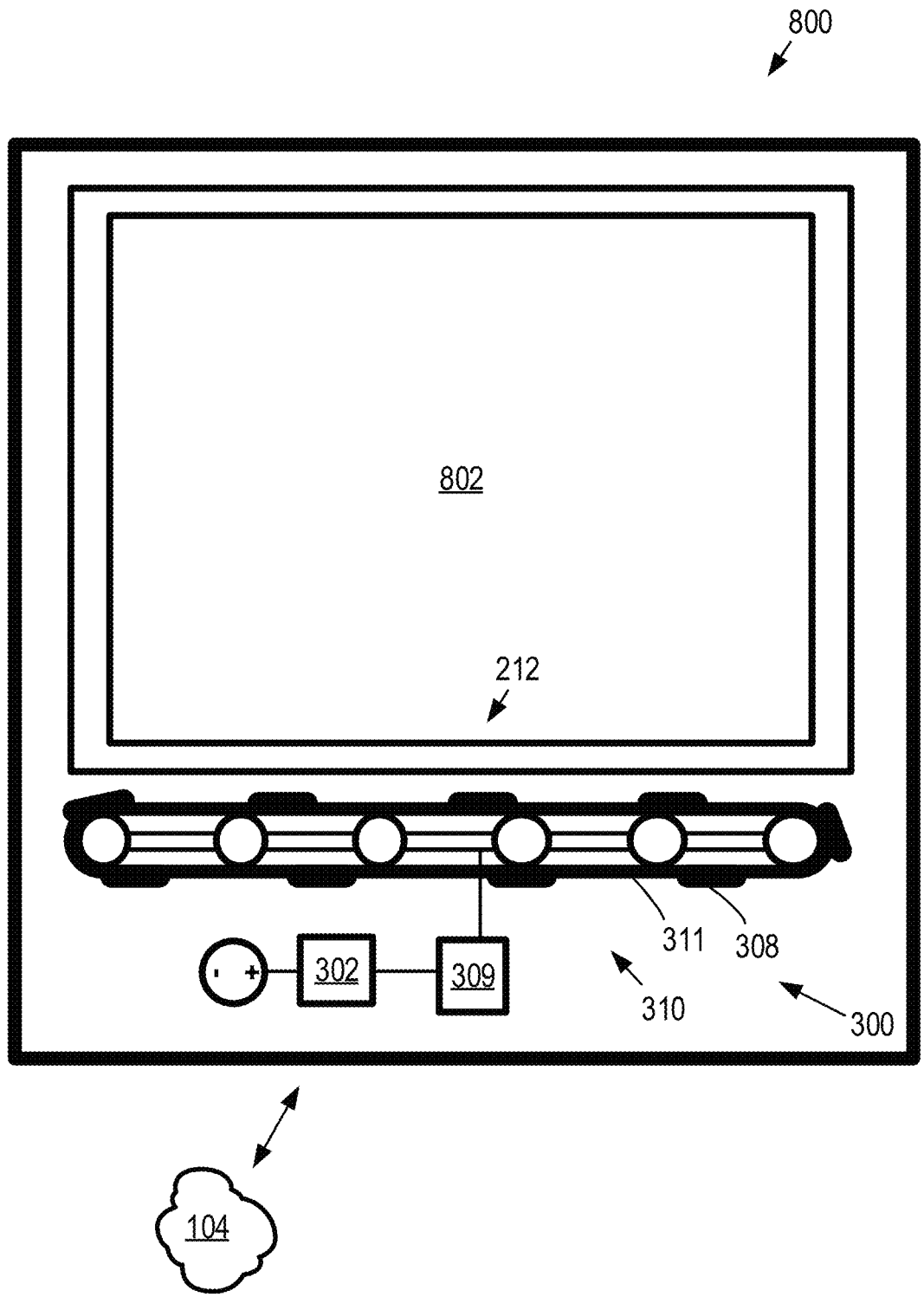
FIG. 8 illustrates a schematic side view of an oven including the system shown in FIG. 3, with some portions of the oven being broken away to reveal internal details of construction, in accordance with some embodiments of the present disclosure.

FIG. 8 illustrates a schematic side view of a regular or non-convection oven 800 including the system 300 shown in FIG. 3, with some portions of the oven being broken away to reveal internal details of construction, in accordance with some embodiments of the present disclosure. As shown, the conveyor 310 of system 300 is below a cavity 802 of the oven 800 and the wall 212, and a surface of the conveyor belt 311 attached to some of the heating elements 308 are facing the cavity 802. Also, the conveyor 310 and system 300 are position near a bottom inner wall of the oven 800 (which can be considered wall 212). This way the conveyor 310 can heat the wall 212 at the bottom of the cavity 802 and the heat from the wall 212 can move upwards through the cavity until the air in the cavity is almost equally heated through the cavity. The movement of the heating elements can also cause the cavity 802 to heat up more consistently than if the heating elements did not move. Also, the controller 302 is shown within the oven 800 communicating with the network(s) 104 making the oven an IoT device and a smart appliance.

Figure 9:
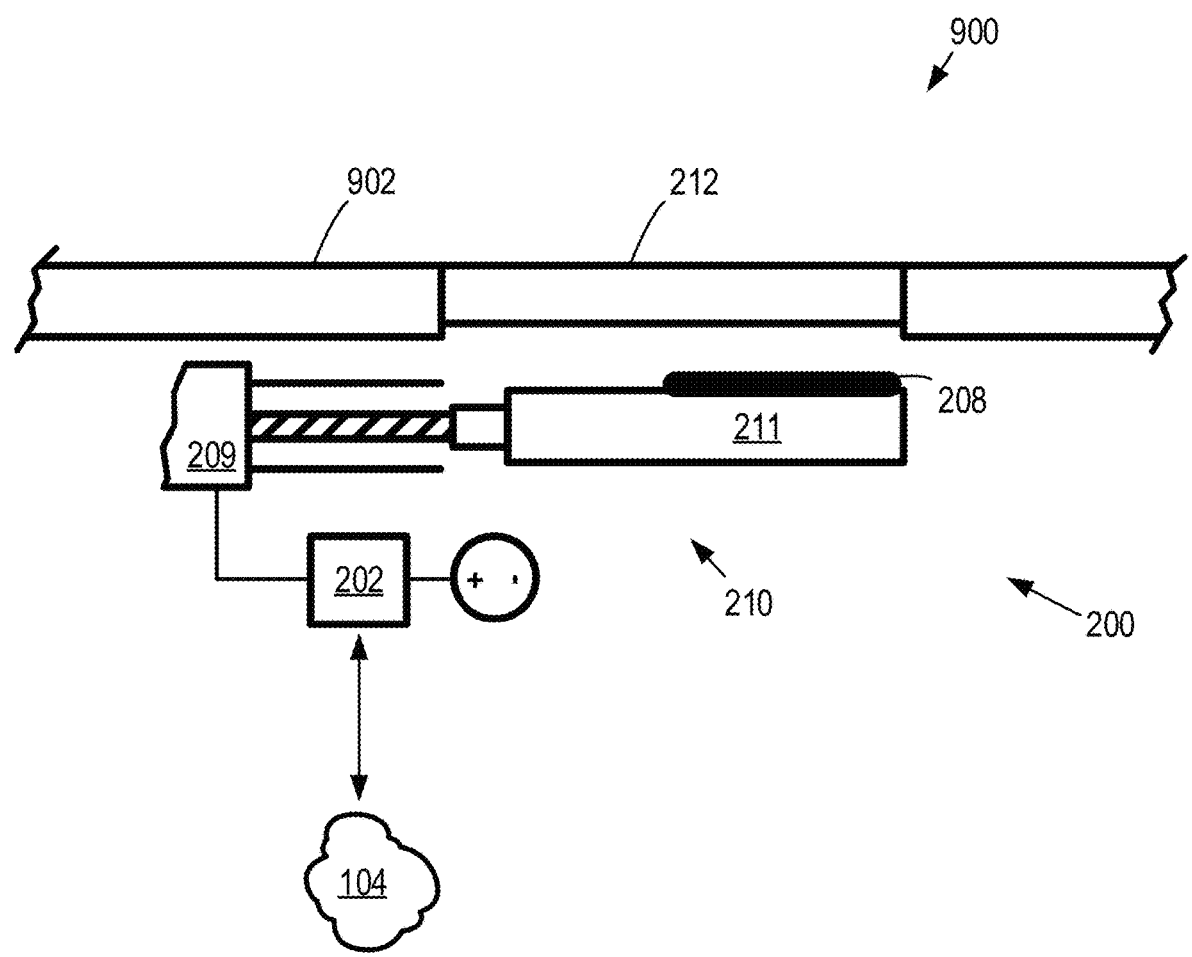
FIG. 9 illustrates a schematic side view of a portion of an induction cooktop including the system shown in FIGS. 2A and 2B, with some portions of the cooktop being broken away to reveal internal details of construction, in accordance with some embodiments of the present disclosure.

FIG. 9 illustrates a schematic side view of an induction cooktop 900 including the system 200 shown in FIGS. 2A and 2B, with some portions of the cooktop being broken away to reveal internal details of construction, in accordance with some embodiments of the present disclosure. As shown, the actuator 210 of system 200 is below the wall 212 (which is part of a burner of the cooktop) as well as wall 902, and the surface of the oscillating part 211 attached to the heating element 208 is facing the wall 212. Also, the actuator 210 and system 200 are positioned under the wall 212. This way the actuator 210 can heat the wall 212 at its bottom and the heat from the wall 212 can move upwards through itself to heat an object placed on the wall. The movement of the heating element can also cause the wall 212 to heat up more consistently than if the heating element did not move. In some embodiments, the wall 902 is heat insulating in that it conducts heat significantly less than the wall 212. This way a user does not burn an object placed on top of wall 902. Also, the controller 202 is shown within the induction cooktop 900 communicating with the network(s) 104 making the cooktop an IoT device and a smart appliance.

Figure 10:
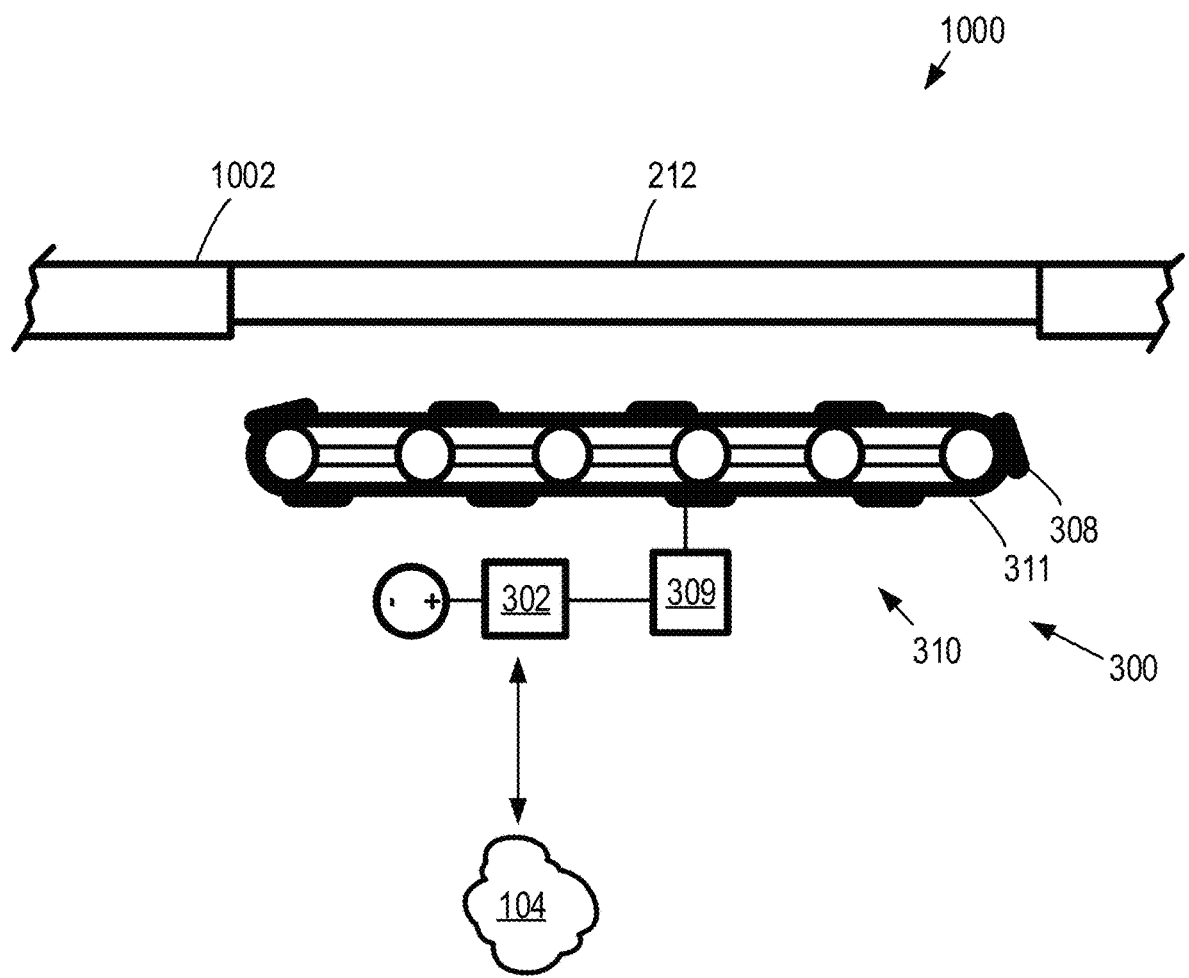
FIG. 10 illustrates a schematic side view of a portion of an induction cooktop including the system shown in FIG. 3, with some portions of the cooktop being broken away to reveal internal details of construction, in accordance with some embodiments of the present disclosure.

FIG. 10 illustrates a schematic side view of an induction cooktop 1000 including the system 300 shown in FIG. 3, with some portions of the cooktop being broken away to reveal internal details of construction, in accordance with some embodiments of the present disclosure. As shown, the conveyor 310 of system 300 is below the wall 212 (which is part of a burner of the cooktop) as well as wall 1002, and a surface of the conveyor belt 311 attached to some of the heating element 308 is facing the wall 212. Also, the conveyor 310 and system 300 are positioned under the wall 212. This way the conveyor 310 can heat the wall 212 at its bottom and the heat from the wall 212 can move upwards through itself to heat an object placed on the wall. The movement of the heating element can also cause the wall 212 to heat up more consistently than if the heating element did not move. In some embodiments, the wall 1002 is heat insulating in that it conducts heat significantly less than the wall 212. This way a user does not burn an object placed on top of wall 1002. Also, the controller 202 is shown within the induction cooktop 1000 communicating with the network(s) 104 making the cooktop an IoT device and a smart appliance.

Figure 11:
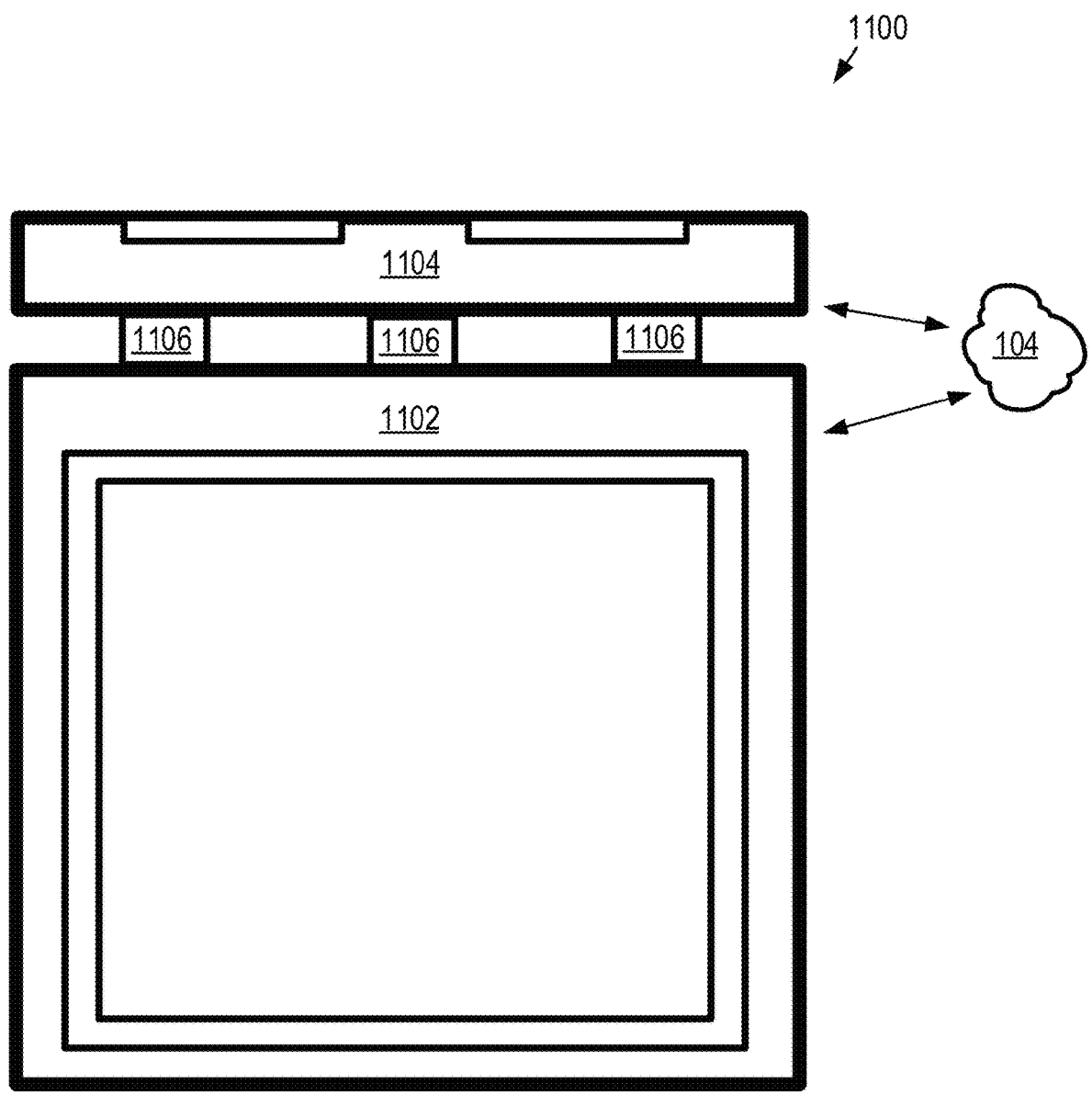
FIG. 11 illustrates a schematic front view of an induction cooktop combined with an oven including one or more of the systems described herein, in accordance with some embodiments of the present disclosure.

FIG. 11 illustrates a schematic front view of an induction cooktop 1104 (which can be or include induction cooktop 900 or 1000 combined with an oven 1102 (which can be or include oven 600, 700 or 800) including one or more of the systems described herein, in accordance with some embodiments of the present disclosure. FIG. 11 also depicts connectors 1106 which can mechanically and/or electrically couple the oven 1102 and the induction cooktop 1104. Also, combination cooktop and oven 1100 can communicate with the network(s) 104 making the combination a combined IoT device and a combined smart appliance.

Figure 12:
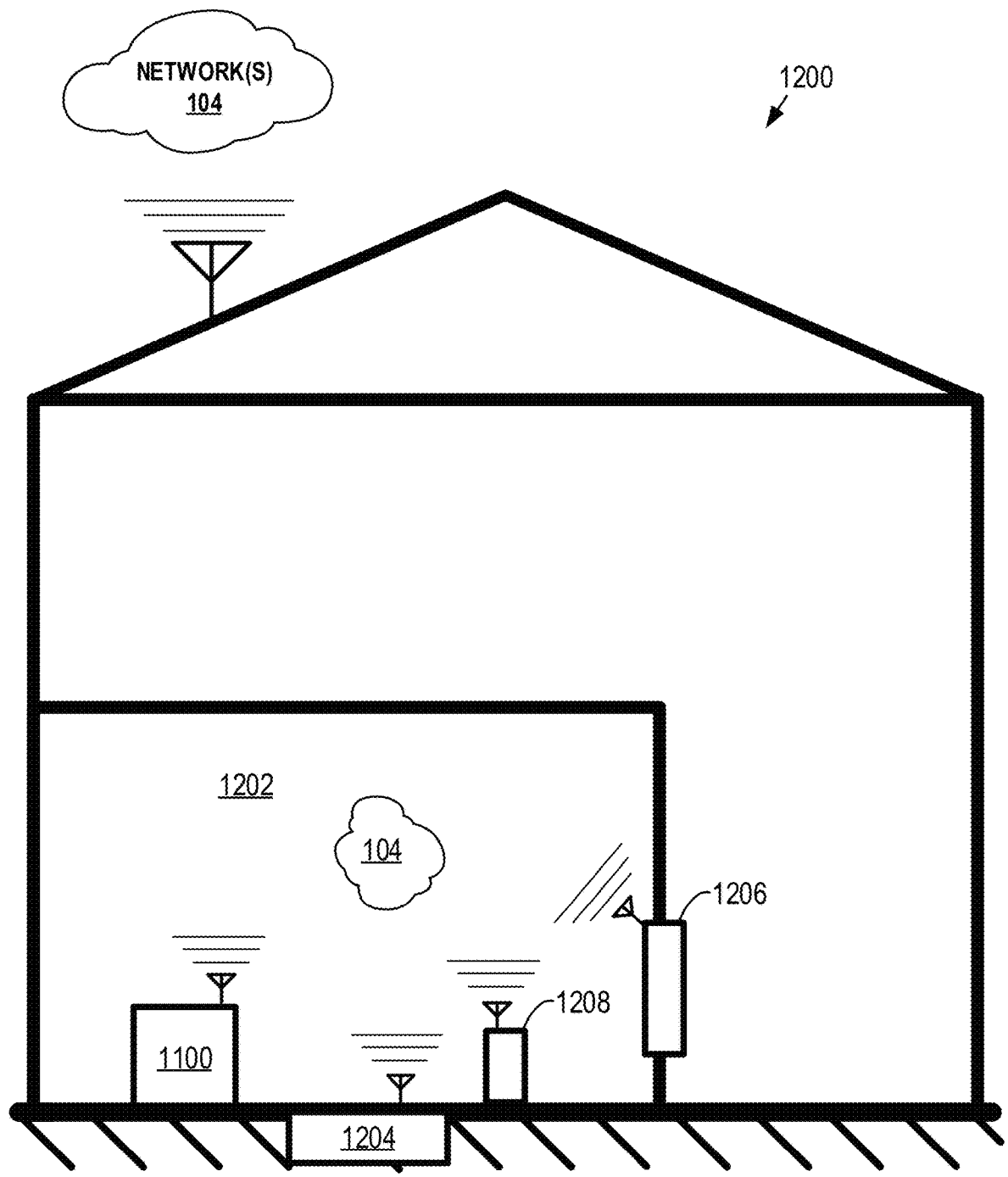
FIG. 12, illustrates a schematic view of a house including the combined cooktop and oven shown in FIG. 11 as well as different types of heaters using one or more of the systems described herein, with some portions of the house being broken away to reveal internal details of construction, in accordance with some embodiments of the present disclosure.

FIG. 12, illustrates a schematic view of a house 1200 including the combination cooktop and oven 1100 shown in FIG. 11 as well as different types of heaters using one or more of the systems described herein, with some portions of the house being broken away to reveal internal details of construction, in accordance with some embodiments of the present disclosure. As depicted in FIG. 12, each of the IoT devices or smart appliances in the room 1202 of the house 1200 (e.g., combination cooktop and oven 1100, floor heater 1204, wall heater 1206, and space heater 1208) can communicate with computing systems via network(s) 104. Also, the house 1200 can be considered a smart house as it is shown communicating with the network(s) 104 in general.

Figure 13:
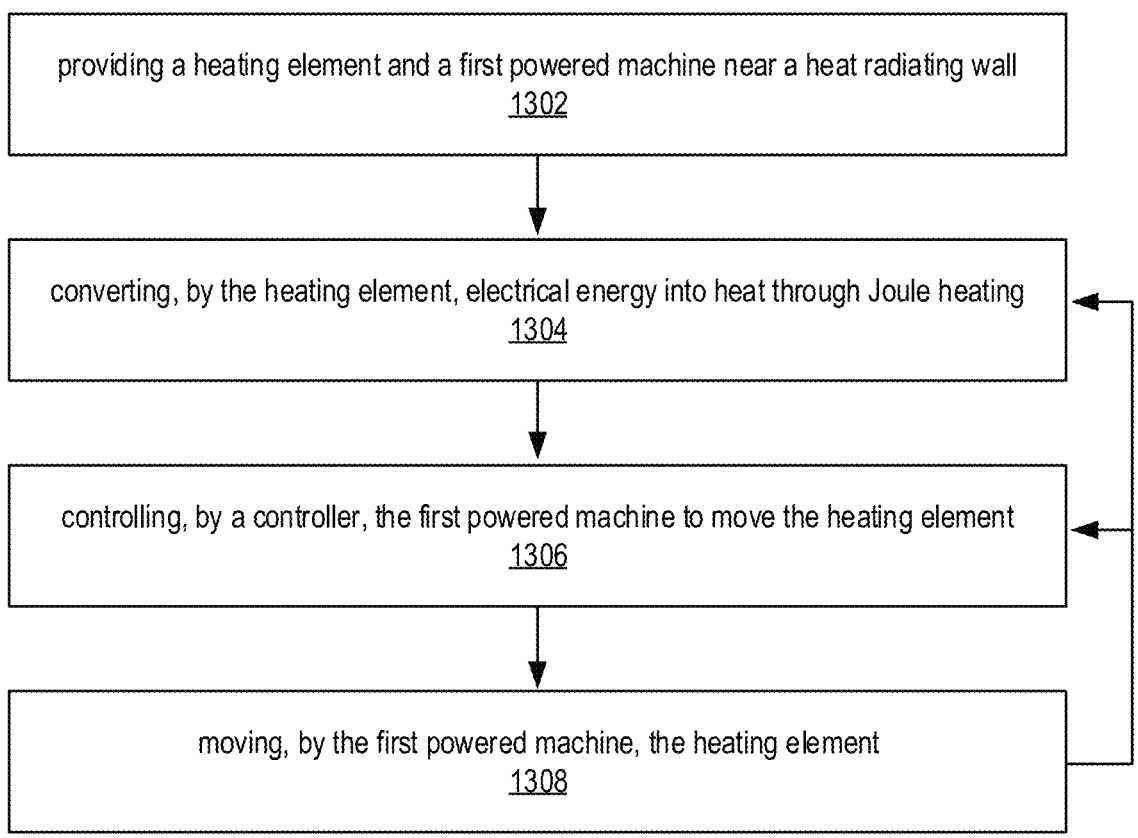
FIGS. 13, 14, and 15 illustrate methods in accordance with some embodiments of the present disclosure.
Figure 14:
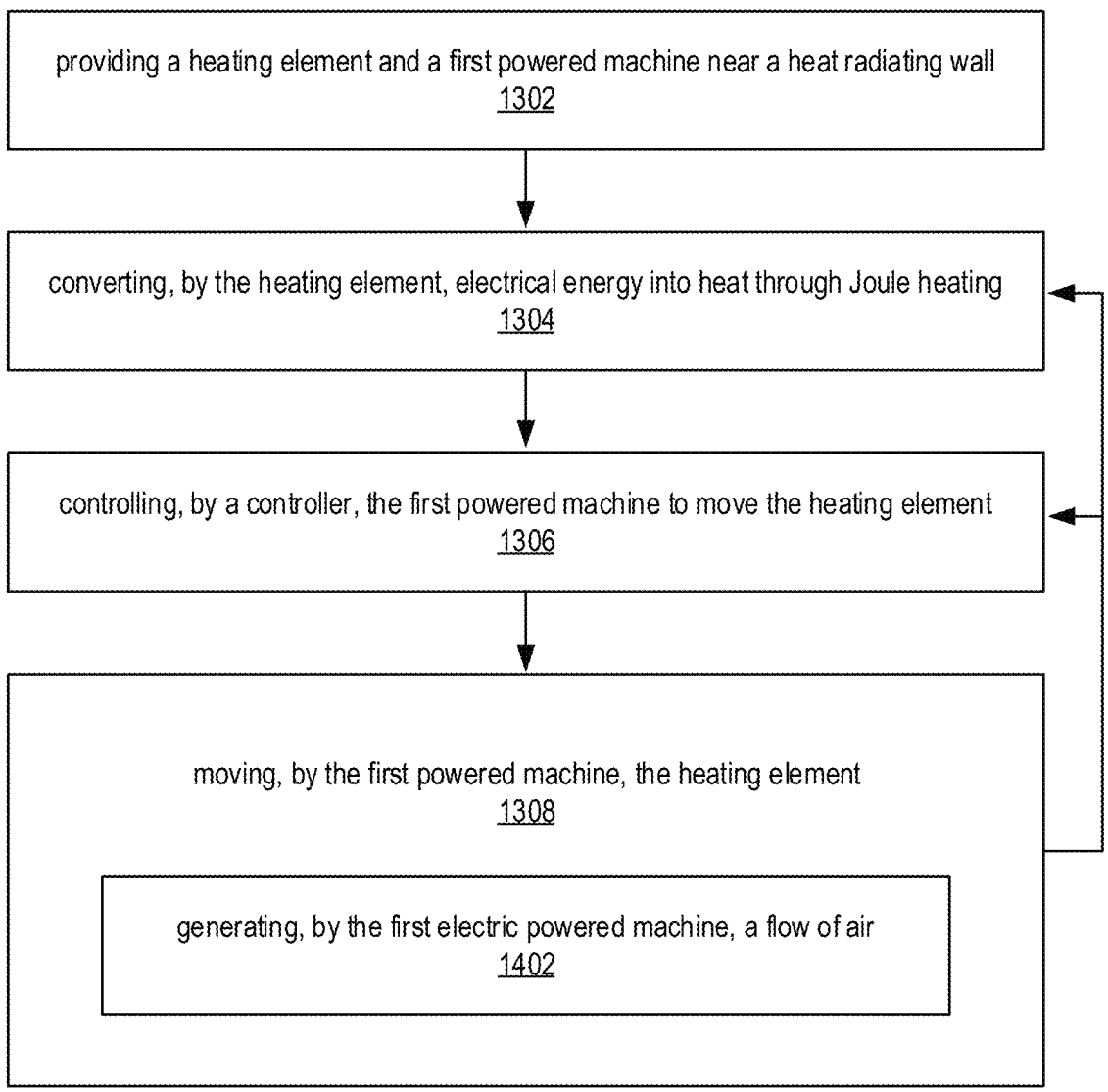
Figure 15:
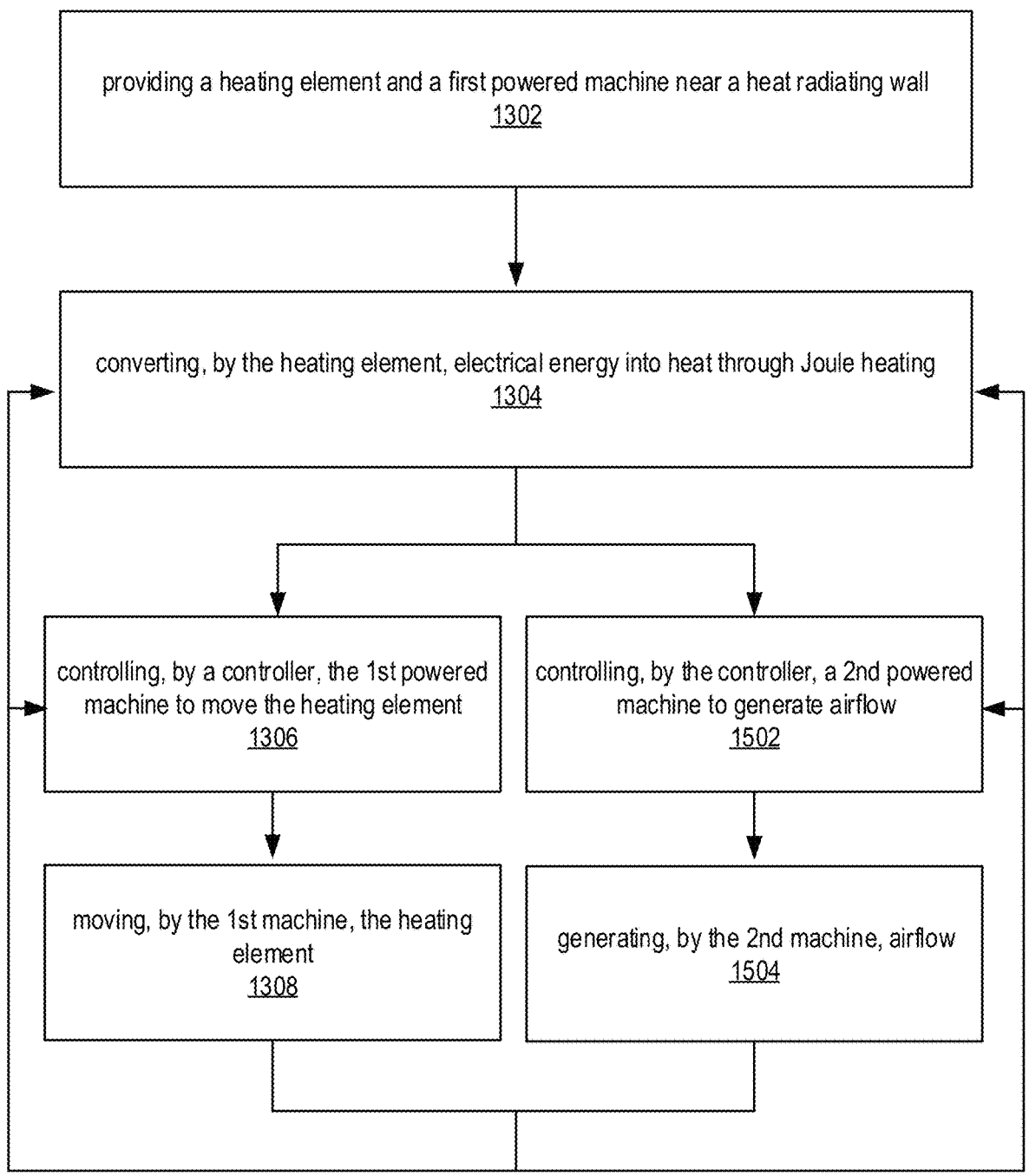

FIGS. 13, 14, and 15 illustrate methods in accordance with some embodiments of the present disclosure. Specifically, FIG. 13 illustrates method 1300 which includes moving a heated heating element (e.g., see heating elements 208 and 308 as shown in FIGS. 2A, 2B, and 3 respectively) to heat a heat radiating wall near the element, such as a heat radiating wall without openings (e.g., see wall 212). In FIG. 13, the method 1300 starts with providing the heating element and a first electric powered machine (e.g., see actuator 210 and conveyor 310 shown in FIGS. 2A, 2B, and 3 respectively) near the heat radiating wall—at step 1302. The heat radiating wall includes a heat conductive material such as stainless steel, heat-dried clay, glass, or the like, or a combination thereof. For example, the heat radiating wall can be a ceramic or ceramic and glass heat radiating wall. Or, it can be a stainless-steel wall only or a stainless-steel wall having ceramic and/or glass elements.

The method 1300 continues with converting, by the heating element, electrical energy into heat through Joule heating—at step 1304. The method 1300 continues with controlling, by a controller (e.g., see controllers 202 and 203 and computing system 400), the first powered machine to move the heating element—at step 1306. The method 1300 continues with moving, by the first powered machine, the heating element according to output of the controller—at step 1308. In the method 1300, the heating element and the first electric powered machine are behind the heat radiating wall. And, when the heating element and the first electric powered machine are powered on, the heating element converts electrical energy into heat which increases the temperature of the heat radiating wall—at step 1304. The first electric powered machine moves the heating element to be next to different areas of the heat radiating wall, at step 1308, so that heat is distributed more evenly to the wall than it would be if the heating element did not move.

The method 1300 can be used for many applications. For example, the method can be used where the heat radiating wall is a wall of a cavity of an oven. 24. It can be used where the heat radiating wall is a heated surface of an electric cooktop. It can be used where the heat radiating wall is a heated outer surface of an electric radiator heater configured to be attached a floor, wall, or ceiling of a building. It can be used where the heat radiating wall is a heated outer surface of an electric space heater. It can be used where the heat radiating wall is a heated outer surface of an electric heat lamp.

At step 1308, the method 1300 can include the first electric powered machine moving the heating element continuously when powered on. Or, at step 1308, the method 1300 can include the first electric powered machine moving the heating element intermittently when powered on. In some alternative embodiments to method 1300, the first electric powered machine moves according to circuitry embedded in the machine and not according to control by a controller. But, in method 1300, at step 1306, the controller controls the first electric powered machine to move the heating element according to instructions stored in memory of the controller and executable by a processor of the controller.

In some embodiments of method 1300, the first electric powered machine includes a fan, and the heating element is attached to or embedded in one or more blades of the fan (e.g., see FIG. 1), or the first electric powered machine includes an actuator (such as a linear actuator, see FIGS. 2A and 2B) or a conveyor (see FIG. 3), and the heating element is attached to or embedded in one or more parts of the actuator or conveyor, respectively.

Specifically, FIG. 14 illustrates method 1400 which includes moving a heated heating element as well as air to heat a heat radiating wall that includes openings and heat an environment on the other side of the heat radiating wall. Method 1400 includes the steps 1302, 1304, 1306, and 1308 of method 1300; however, method 1400 also includes step 1402 in which the method includes generating, by the first electric powered machine, a flow of air. Step 1402 occurs when the machine is powered on. With method 1400, the heat radiating wall includes openings so that the generated flow of air can flow through the wall into an environment on the other side of the wall. The heat radiating wall includes openings throughout the wall for air to pass through the wall. The openings can be formed by a mesh structure in the wall or holes, apertures, gaps, or slits cut, carved or drilled out of a wall. In some embodiments of method 1400, the first electric powered machine includes a fan, and the heating element is attached to or embedded in one or more blades of the fan (e.g., see FIG. 1).

Specifically, FIG. 15 illustrates method 1500 which includes moving a heated heating element as well as air to heat a heat radiating wall that includes openings and heat an environment on the other side of the heat radiating wall. Method 1500 includes the steps 1302, 1304, 1306, and 1308 of method 1300; however, method 1500 also includes step 1502 in which the method includes controlling, by the controller, a second powered machine to generate airflow. Also, method 1500 includes generating, by the second machine, airflow. The airflow is generated when the second machine is powered on. With method 1500, the heat radiating wall includes openings so that the generated flow of air can flow through the wall into an environment on the other side of the wall.

With respect to method 1500, the heat radiating wall includes openings throughout the wall for air to pass through the wall, and the second electric powered machine is behind the heat radiating wall. And, when the heating element, the first electric powered machine, and the second electric powered machine are powered on, the second electric powered machine generates a flow of air that flows towards and through the openings of the wall. Also, the heating element converts electric energy into heat which increases the temperature of the wall, and the first electric powered machine moves the heating element behind the wall such that a surface of the wall opposing the heating element increases in temperature uniformly throughout the surface. The heat radiating wall includes openings throughout the wall for air to pass through the wall. The openings can be formed by a mesh structure in the wall or holes, apertures, gaps, or slits cut, carved or drilled out of a wall. In some embodiments of method 1500, the second electric powered machine includes a fan, and the heating element is attached to or embedded in one or more blades of the fan.

The methods 1400 and 1500 can be used for many applications. For example, the method can be used where the heat radiating wall is a wall of a cavity of a convection oven. It can be used where the heat radiating wall with openings is a heated outer surface of an electric radiator heater configured to be attached a floor, wall, or ceiling of a building. It can be used where the heat radiating wall with openings is a heated outer surface of an electric space heater. It can be used where the heat radiating wall with openings is a heated outer surface of an electric heat lamp.

In the methods 1400 and 1500, the air that is flowing towards and through the wall is heated by the heating element and further heats the environment on the other side of the wall. The radiating wall also heats the environment on the other side of the wall. In the method 1300, only the radiating wall directly heats the environment on the other side of the wall and the environment on the other side of the wall is not heated by air flowing through the wall. In the methods 1400 and 1500, the heated air flowing through the wall with openings also increases movement of the air in the environment on the other side of the wall. Thus, the methods 1400 and 1500 are useful for improving heating in a cooking cavity of a convection oven as well as any other type of cavity that would benefit from convection heating (such as a room in a house). The method 1300 is useful for improving heating of a heated surface without openings, such as a surface of an induction heating cooktop as well as any other type of heated surface without openings that would benefit from being heated uniformly.

As shown in the methods 1300, 1400, and 1500, certain steps of the methods are repeated, and some latter steps are shown providing feedback to enhance previously executed steps. For example, with sensors that sense different parameters of the moving of the heating element in step 1308, the output of the sensors can be used as an input for the controller to improve the controlling of the converting of electrical energy into heat at step 1304. Also, for example, the output of such sensors can be used as an input for the controller to improve the controlling of the first powered machine to move the heating element at step 1306. Also, in step 1304, sensors can be used to sense the temperature of the heated element, the wall, the air behind the wall, or the air on the other side of the wall to improve the conversion of electrical energy into heat at step 1304 or the controlling of the conversion. Such sensed temperature information can also be used to improve the controlling of the movement of the first or the second powered machine (e.g., see methods 1400 and 1500 respectively).

In some embodiments, the methods described herein (such as methods 1300, 1400, and 1500) can be performed by an apparatus. Such an apparatus includes a heating element configured to convert electrical energy into heat through Joule heating, a first electric powered machine configured to move the heating element, and a heat radiating wall including a heat conductive material. The heating element and the first electric powered machine are behind the heat radiating wall. When the heating element and the first electric powered machine are powered on, the heating element converts electrical energy into heat which increases the temperature of the heat radiating wall, and the first electric powered machine moves the heating element to be next to different areas of the heat radiating wall so that heat is distributed more evenly to the wall than it would be if the heating element did not move. In some embodiments, the heat radiating wall can be a wall of a cavity of an oven. The heat radiating wall can be a heated surface of an electric cooktop. The heat radiating wall can be a heated outer surface of an electric radiator heater configured to be attached a floor, wall, or ceiling of a building. The heat radiating wall can a heated outer surface of an electric space heater. The heat radiating wall can be a heated outer surface of an electric heat lamp.

In some embodiments, the first electric powered machine is configured to move the heating element continuously when powered on. In some other embodiments, the first electric powered machine is configured to move the heating element intermittently when powered on. In some embodiments, the apparatus includes an electronic controller configured to control the first electric powered machine to move the heating element according to instructions stored in memory of the controller and executable by a processor of the controller.

In some embodiments, the first electric powered machine is further configured to generate a flow of air when powered on, and the heat radiating wall includes openings throughout the wall for air to pass through the wall. In such embodiments, the first electric powered machine can include a fan and the heating element can be attached to or embedded in one or more blades of the fan.

In some embodiments, the apparatus includes a second electric powered machine configured to generate a flow of air when powered on. The heat radiating wall, in such examples, includes openings throughout the wall for air to pass through the wall. Also, the second electric powered machine is behind the heat radiating wall. And, when the heating element, the first electric powered machine, and the second electric powered machine are powered on, the second electric powered machine generates a flow of air that flows towards and through the wall with openings, the heating element converts electric energy into heat which increases the temperature of the wall with openings, and the first electric powered machine moves the heating element behind the wall such that a surface of the wall opposing the heating element increases in temperature uniformly throughout the surface. Furthermore, in such embodiments, the second electric powered machine can include a fan and the heating element can be attached to or embedded in one or more blades of the fan. Also, the wall with openings can be a wall of a cavity of a convection oven, a heated outer surface of an electric radiator heater configured to be attached a floor, wall, or ceiling of a building, a heated outer surface of an electric space heater, or a heated outer surface of an electric heat lamp. Also, the first electric powered machine can be configured to move the heating element continuously when powered on, or the first electric powered machine can be configured to move the heating element intermittently when powered on. Or, the apparatus can further include an electronic controller configured to control the first electric powered machine to move the heating element according to instructions stored in memory of the controller and executable by a processor of the controller.

In some embodiments, the apparatus is a part of or is essentially one of the systems described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
a heating element configured to convert electrical energy into heat;
a first electric powered machine configured to move the heating element;
a surface of a stove or an oven,
wherein the heating element and the first electric powered machine are near the surface, and
wherein the heating element converts electrical energy into heat which increases the temperature of the surface; and
an electronic controller configured to control the first electric powered machine to move the heating element according to instructions stored in memory of the controller and executable by a processor of the controller,
wherein the first electric powered machine is further configured to generate a flow of air when powered on, and
wherein the first electric powered machine comprises a fan and the heating element is attached to or embedded in one or more blades of the fan.

2. The apparatus of claim 1, wherein the heating element and the first electric powered machine are behind the surface, and wherein the surface is a part of a wall of a cavity of an oven.

3. The apparatus of claim 1, wherein the heating element and the first electric powered machine are behind the surface, and wherein the surface is a part of a heated surface of an electric cooktop.

4. The apparatus of claim 1, wherein the first electric powered machine is configured to move the heating element continuously when powered on.

5. The apparatus of claim 1, wherein the first electric powered machine is configured to move the heating element intermittently when powered on.

6. The apparatus of claim 1, wherein the first electric powered machine moves the heating element to be next to different areas of the surface.

7. A method, comprising:
converting, by a heating element, electrical energy into heat;
moving, by a first electric powered machine, the heating element; and
providing the heating element and the first electric powered machine near a surface of a stove or an oven,
wherein the heating element converts electrical energy into heat which increases the temperature of the surface,
wherein the first electric powered machine generates a flow of air when powered on, and
wherein the first electric powered machine comprises a fan and the heating element is attached to or embedded in one or more blades of the fan.

8. A system, comprising:
a heating element configured to convert electrical energy into heat;
a first electric powered machine configured to move the heating element; and
a surface of a stove or an oven,
wherein the heating element and the first electric powered machine are behind the surface,
wherein the heating element converts electrical energy into heat which increases the temperature of the surface, and
wherein the first electric powered machine moves the heating element to be next to different areas of the surface.

9. The method of claim 7, wherein the heating element and the first electric powered machine are behind the surface.

10. The method of claim 7, wherein the surface is a part of a wall of a cavity of an oven.

11. The method of claim 7, wherein the surface is a part of a heated surface of an electric cooktop.

12. The method of claim 7, wherein the first electric powered machine is configured to move the heating element continuously when powered on.

13. The method of claim 7, wherein the first electric powered machine is configured to move the heating element intermittently when powered on.

14. The method of claim 7, wherein the first electric powered machine moves the heating element to be next to different areas of the surface.

15. The method of claim 12, wherein the first electric powered machine moves the heating element to be next to different areas of the surface.

16. The method of claim 13, wherein the first electric powered machine moves the heating element to be next to different areas of the surface.

17. The system of claim 8, wherein the surface is a part of a wall of a cavity of an oven.

18. The system of claim 8, wherein the surface is a part of a heated surface of an electric cooktop.

19. The system of claim 8, wherein the first electric powered machine is configured to move the heating element continuously when powered on.

20. The system of claim 8, wherein the first electric powered machine is configured to move the heating element intermittently when powered on.

\* \* \* \* \*